Patented July 21, 1931

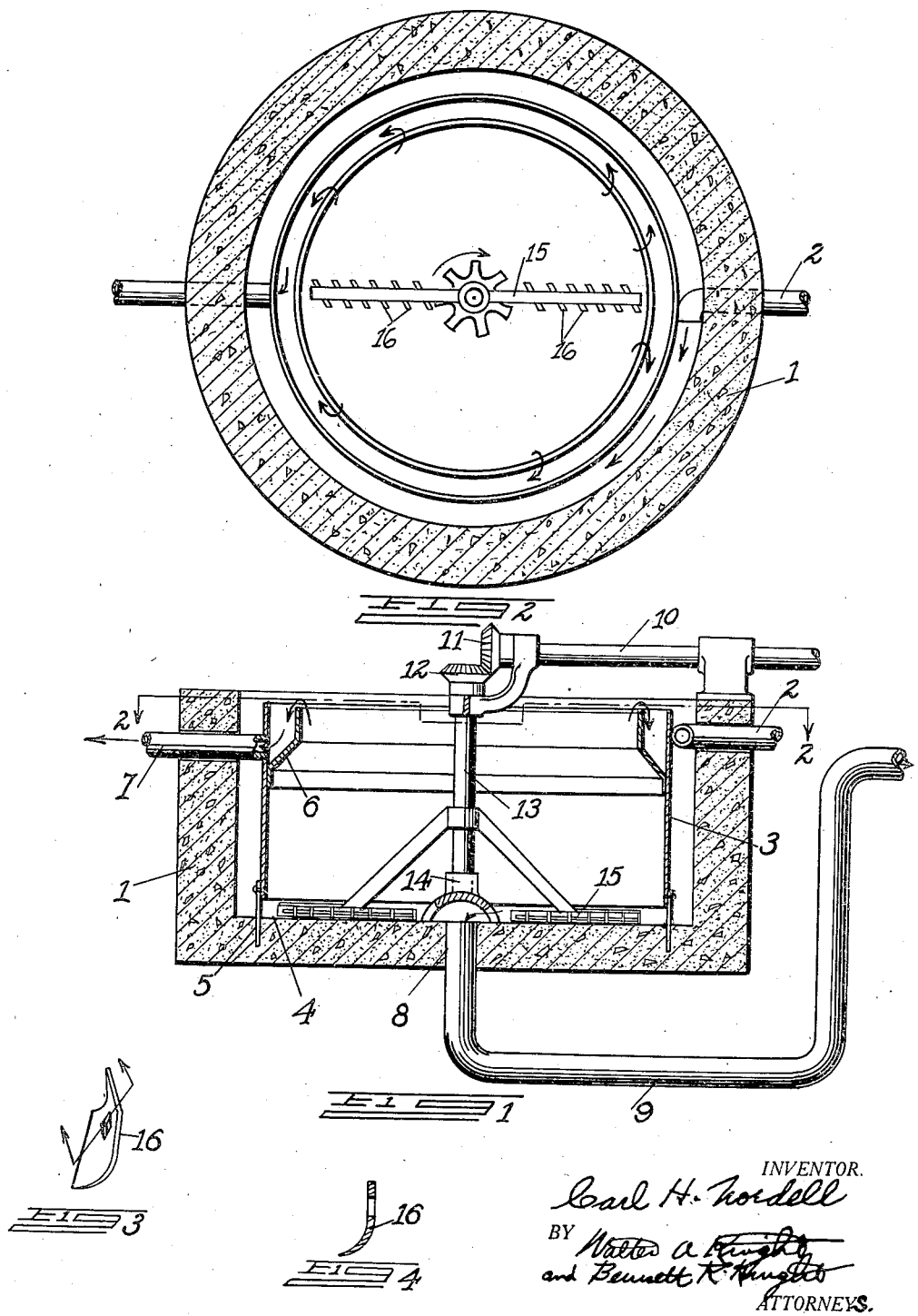

1,815,159

UNITED STATES PATENT OFFICE

CARL H. NORDELL, OF CHICAGO, ILLINOIS

METHOD OF AND MEANS FOR SEPARATING COMMINUTED MATTER FROM THE LIQUID IN WHICH IT IS IMMERSED

Application filed December 7, 1928. Serial No. 324,535.

This invention relates to a method of and means for effecting in an efficient manner the separation of comminuted solids from liquids in which they are immersed and with which they are commingled and especially liquids containing comparatively large amounts of pulpy and flocculent solids; as activated sludge.

The principal object of the invention is to continuously feed in the mingled liquid and solids to be sedimented, and to simultaneously and continuously withdraw the clear liquid substantially relieved of sediment and the heavy concentrated sediment in separate streams, without harmful disturbance of the body of material undergoing treatment.

In the present method of treating sewage disposal by the activated sludge process, the material to be treated generally known as mixed liquor and containing by volume 20% or more of pulpy solids, is settled in tanks that are either round or rectangular in horizontal cross-section.

The apparatus now used admits the mixed liquor at one side of the tank, the clear liquor overflows from the other side and the solid matter is removed from at or near the center of the bottom of the tank, but the contents of the tank do not rotate.

Owing to the fact that the volume of sludge is comparatively great, its subsidence at various velocities in different parts of the treatment tank, produces surges which cause eddies, so that some of the solids are not precipitated but are carried over with the clear overflow.

My present invention is an improvement over this existing practice as the method of introducing the mixed liquor and of withdrawing the clear supernatant liquor and the sludge provides an orderly flow which prevents eddies. Also the movement of the solids to the place of withdrawal is facilitated by the hydrostatic forces set up in the moving body of material under treatment.

The particular embodiment of my invention selected for illustration is a settling tank for the treatment of sewage disposal by the activated sludge process, in which Figure 1 is a vertical axial section except the scraper mechanism shafts and gears which are shown in full lines, Fig. 2 is a cross section on the line 2—2 of Fig. 1, Fig. 3 a detail is a perspective of one of the scrapers, and Fig. 4 a detail, is a vertical section through one of the scrapers.

It should be kept in mind that in the activated sludge process of sewage disposal the mixed liquor contains substantially 20% or more by volume of pulpy solids, and is settled in either cylindrical or rectangular tanks of large size—for instance 100 feet in diameter.

Referring now to the drawings, 1 is a cylindrical tank whose axis is vertically positioned, made of concrete or other suitable material, with inlet pipe 2, shaped to deliver the sludge into the annular space between the inside wall of the tank 1 and the outside of a concentric baffle wall 3 substantially tangentially of the latter, so as to impart a rotating motion to the sludge in said annular space. The baffle 3 is spaced above the floor 4 of the tank 1 and may be supported in any convenient manner as on feet 5 bedded in the material of which the tank 1 is made.

The baffle 3 has an annular channel forming member 6 secured to its inner side near the top to form an annular trough into which the clear liquor overflows and from which it is discharged through effluent pipe 7.

The tank 1 has an axial outlet 8 through its bottom, fitted with sludge draw off pipe 9, through which sludge is withdrawn.

A horizontal drive shaft 10 has a bevel gear 11 which drives vertical shaft 13 through bevel gear 12. Shaft 13 is journalled at its lower end in the cage 14 which is positioned over the outlet opening 8.

A scraper 15 preferably with plow-share blades 16 positioned to forward the precipitated solid matter toward the outlet opening 8 is rotatively secured to the shaft 13.

The operation is as follows:

The mixture to be treated enters the annular space between the tank 1 and the baffle wall 3 through a pipe 2, rotates in the direction indicated by the arrows, falls to the bottom, passes under the bottom of the baffle wall 3 and fills the enclosure formed by said baffle wall. By gravity the sludge is pecipitated toward the bottom and the clear liquid overflows the top of the channel forming member 6 into the trough formed by the member 6 and the top of the baffle 3 and is discharged though the effluent pipe 7 which extends downwardly terminating somewhat below the level of the inlet 2. Whenever the sludge is of such a nature that it has a tendency to stick to the bottom of the tank 1, the scraper mechanism is rotated slowly concentrating the sludge at the center of the floor of the tank where it falls through the opening 8 into the sludge removal pipe 9.

As the body of liquid within the sedimentation tank rotates substantially en masse there is practically no turbulence within the tank, and as the flow proceeds in a general spiral direction there is practically no opportunity for the formation of eddies.

I claim as my invention and desire to secure by Letters Patent of the United States:

1. In an apparatus for separating sediment from the liquid in which it is immersed, the combination of an open substantially cylindrical tank, a substantially concentric baffle within and spaced from the tank, the baffle of somewhat less height than the tank and spaced above the inside of the bottom of the tank, a trough formed around the top of the baffle so as to permit liquid to overflow from the free top of liquid within the baffle into the trough, a fluid outlet from the trough to the exterior of the apparatus, an inlet admitting the mixed sediment and liquid to be treated to the space between the tank and baffle substantially tangentially of the baffle, and near the top of said space, a substantially axial opening in the bottom of the tank through which sludge is removed from the tank and a goose-neck conduit from said sludge outlet having its outlet end elevated above the tank bottom but somewhere below the inlet.

2. In an apparatus for separating sediment from the liquid in which it is immersed, the combination of an open substantially cylindrical tank, a substantially concentric baffle within and spaced from the tank, the baffle of somewhat less height than the tank and spaced above the inside of the bottom of the tank, a trough formed around the top of the baffle so as to permit liquid to overflow from the free top of liquid within the baffle into the trough, a fluid outlet from the trough to the exterior of the apparatus, an inlet admitting the mixed sediment and liquid to be treated to the space between the tank and baffles substantially tangentially of the baffle, and near the top of said space, a substantially axial opening in the bottom of the tank through which sludge is removed from the tank, a goose-neck conduit from said sludge outlet having its outlet end elevated above the tank bottom but somewhat below the inlet and means for moving the precipitated sludge toward the opening in the bottom of the tank.

In testimony whereof I have hereunto set my hand.

CARL H. NORDELL.